(12) United States Patent
Varadarajan et al.

(10) Patent No.: US 9,122,714 B2
(45) Date of Patent: *Sep. 1, 2015

(54) TRANSPARENT CHECKPOINTING AND PROCESS MIGRATION IN A DISTRIBUTED SYSTEM

(71) Applicant: OPEN INVENTION NETWORK, LLC, Pound Ridge, NY (US)

(72) Inventors: Srinidhi Varadarajan, Blacksburg, VA (US); Joseph Ruscio, Blacksburg, VA (US)

(73) Assignee: Open Invention Network, LLC, Durham, NC (US)

( * ) Notice: Subject to any disclaimer, the term of this patent is extended or adjusted under 35 U.S.C. 154(b) by 17 days.

This patent is subject to a terminal disclaimer.

(21) Appl. No.: 13/942,271

(22) Filed: Jul. 15, 2013

(65) Prior Publication Data

US 2013/0311826 A1 Nov. 21, 2013

Related U.S. Application Data

(63) Continuation of application No. 12/420,015, filed on Apr. 7, 2009, now Pat. No. 8,489,921, which is a continuation of application No. 10/595,857, filed as application No. PCT/US2004/038853 on Nov. 17, 2004, now Pat. No. 7,536,591.

(60) Provisional application No. 60/520,254, filed on Nov. 17, 2003.

(51) Int. Cl.
*G06F 11/14* (2006.01)
*G06F 17/30* (2006.01)
*G06F 11/20* (2006.01)

(52) U.S. Cl.
CPC ...... *G06F 17/30303* (2013.01); *G06F 11/1438* (2013.01); *G06F 11/1458* (2013.01); *G06F 11/1471* (2013.01); *G06F 11/203* (2013.01); *G06F 11/1482* (2013.01); *G06F 11/2046* (2013.01)

(58) Field of Classification Search
CPC .............. G06F 11/141; G06F 11/1412; G06F 11/1446; G06F 11/1451; G06F 11/1458
USPC ......................... 714/15, 16, 19, 20
See application file for complete search history.

(56) References Cited

U.S. PATENT DOCUMENTS

| | | | | |
|---|---|---|---|---|
| 5,828,821 | A * | 10/1998 | Hoshina et al. | 714/15 |
| 6,038,639 | A * | 3/2000 | O'Brien et al. | 711/114 |
| 6,480,944 | B2 * | 11/2002 | Bradshaw et al. | 711/162 |
| 7,398,420 | B2 * | 7/2008 | Sutoh | 714/15 |
| 7,536,591 | B2 * | 5/2009 | Varadarajan et al. | 714/15 |

* cited by examiner

*Primary Examiner* — Joseph Schell
(74) *Attorney, Agent, or Firm* — Haynes and Boone, LLP

(57) ABSTRACT

A distributed system for creating a checkpoint for a plurality of processes running on the distributed system. The distributed system includes a plurality of compute nodes with an operating system executing on each compute node. A checkpoint library resides at the user level on each of the compute nodes, and the checkpoint library is transparent to the operating system residing on the same compute node and to the other compute nodes. Each checkpoint library uses a windowed messaging logging protocol for checkpointing of the distributed system. Processes participating in a distributed computation on the distributed system may be migrated from one compute node to another compute node in the distributed system by re-mapping of hardware addresses using the checkpoint library.

20 Claims, 5 Drawing Sheets

TRANSPARENT CHECKPOINTING AND PROCESS MIGRATION IN A DISTRIBUTED SYSTEM

RELATED APPLICATIONS

This application is a continuation of U.S. application Ser. No. 12/420,015, filed Apr. 7, 2009, titled TRANSPARENT CHECKPOINTING AND PROCESS MIGRATION IN A DISTRIBUTED SYSTEM, now issued U.S. Pat. No. 8,489,921, issued on Jul. 16, 2013, which is a continuation of U.S. application Ser. No. 10/595,857, filed Apr. 26, 2007, titled TRANSPARENT CHECKPOINTING AND PROCESS MIGRATION IN A DISTRIBUTED SYSTEM, now issued U.S. Pat. No. 7,536,591, issued on May 19, 2009, which claims priority to PCT Application No. PCT/US2004/038853, filed Nov. 17, 2004, which claims priority to U.S. Provisional Application Ser. No. 60/520,254, filed Nov. 17, 2003, titled TRANSPARENT CHECKPOINTING AND MIGRATION OF PARALLEL CODES OVER GRID INFRASTRUCTURES, which is hereby incorporated in full by reference herein.

BACKGROUND

The present disclosure generally relates to distributed computing systems, and more particularly, to improving the checkpointing of distributed computations executed on such systems.

Cluster supercomputing is the practice of connecting individual computing nodes to create a distributed system that provides a computing resource capable of solving complex problems. These nodes may be individual desktop computers, servers, processors or similar machines capable of hosting an individual instance of computation. These nodes are constructed out of hardware components including, but not limited to, processors, volatile memory (RAM), magnetic storage drives, mainboards, network interface cards, etc. There has been a thrust recently in the HPC (High Performance Computing) community towards utilizing distributed systems as opposed to the more traditional custom supercomputers. This movement has largely been motivated by the relatively recent availability of high speed network interconnects (e.g., Myrinet Quadrics, and Infiniband) that allow distributed systems to reach similar levels of efficiency as those observed by traditional custom supercomputers at a fraction of the cost.

Such systems still suffer from the major drawback of comparatively poor system reliability. Assuming for illustration that the average individual computing node C has a reliability of x, the probability that none of the hardware components that comprise C will fail in a given day. Often x is what appears to be a very high probability, perhaps 99.9%. This represents excellent reliability for the normal consumer, who has no issue with having to perform maintenance on the single component approximately once a year. The quandary arises however, when one examines precisely how x behaves with regards to the probability of any single node Ci in the distributed system failing. The probability P of any node Ci failing in a group of n nodes is given by:

$P = n(1-x) = n(1-0.999) = n(0.001)$

As n increases, the probability of a node falling on a given day increases linearly. Indeed, once n crests 1000, a not uncommon number of components for larger distributed systems, it is almost guaranteed that a minimum of one node will fail on a daily basis. This lack of reliability is further exacerbated by the fact that additional node failures are caused by imperfect system software. Any distributed computation that was utilizing the failed node would then have to be restarted. Many of the HPC applications which utilize large distributed systems take days or weeks, even months to complete, most likely several failed attempts would be required before a distributed computation manages to complete, if at all. As a result distributed systems unable to tolerate failures are unusable for truly large scale supercomputing.

If there were a method to save the state of a distributed computation such that it could be restarted in that state after failures were resolved, then combining that method with a distributed system might result in a computing resource with the reliability of a traditional supercomputer, at a fraction of the cost. There have been numerous attempts to provide such a method, almost all of which fall into one of two abstract classifications: checkpoint-based protocols and log-based protocols. A comprehensive survey of both checkpoint-based and log-based protocols is available in E. N. (Mootaz) Elnozahy, Lorenzo Alvisi, Yi-Min Wang, and David B. Johnson. A Survey of Rollback-Recovery Protocols in Message-Passing Systems. ACM Comput. Surv., 34(3): 375-408, 2002, which is incorporated herein by reference.

The requirements to "checkpoint" or record the state of a single non-distributed computation is simple and well known. It involves merely recording the state (e.g., global data, stack, heap, mapped memory, and processor context) of the software process that realizes the computation, to some form of persistent storage. This data saved to persistent storage is known as a "checkpoint". At a later time the checkpoint may be read from stable storage and loaded by a process, after which computation will transparently resume at the point of execution in the saved state. Periodic checkpointing of a long running computation allows for tolerance of failures. A computation can be restarted from its most recent checkpoint once the failure has been resolved. Utilizing this method the only part of the computation lost is that which took place in the interval between the most recent checkpoint and the failure.

When one attempts to apply this same method to a distributed computation, however, the challenge becomes much more substantial. A distributed computation is one in which several instances of computation work in concert to solve a single problem. Each instance of computation or "process" is usually implemented as an individual OS process or a thread of execution inside an OS process. The cooperation between the separate processes takes the form of exchanged messages. These messages are exchanged either over an interconnection network or through the accessing and modification of shared memory.

In order for a checkpoint of a distributed computation to be of use, ft must represent a state that is globally consistent. A globally consistent state is one that could have been reached during the normal course of the execution of the computation. The difficulty in checkpointing a distributed computation lies in the fact that at any given time there are probably many messages "in-flight" between the different processes, implying that the communication channels possess state that must be captured.

Consider a distributed computation comprised of two processes ($P_s$ and $P_r$) at either end of a communication channel. $P_s$ is checkpointed prior to sending a particular message m, while $P_r$ is checkpointed after the receipt of m. The global state represented by the aggregate of the two checkpoints is not consistent because one process has received a message that the other process never sent. This phenomenon is referred to as an orphan message and demonstrates that in order to ensure that the checkpoint of a distributed computation is globally consistent there must be some level of coordination between the individual processes.

Almost all conventional methods to checkpoint distributed computations are based on the method of Distributed Snapshots as described, for example, by K. Mani Chandy and Leslie Lamport. Distributed Snapshots: Determining Global States of Distributed Systems. ACM Trans. Comput. Syst., 3(1): 61-75, 1985, which is incorporated herein by reference. This method is a global state detection mechanism that achieves coordination through the use of 'marker' messages. It relies on a fundamental assumption that the communication channels of the distributed system are reliable, FIFO (First-In First-Out) queues that guarantee all messages sent by one process to another are received in-order and without error. When a single process in such a distributed computation wishes to detect a global state (which can be recorded as a checkpoint) it sends a marker message out on all its communication channels and immediately records its local state. Each process on the other end of a communication channel receives the marker message and records its local state. The process then forwards the marker message on each channel with the exception of the channel on which the marker was received. These marker messages propagate throughout the distributed system and coordinate the checkpointing of individual processes such that the aggregate of all the individual checkpoints equates to a globally consistent state.

In order to understand how this coordination is accomplished, consider again the case of a distributed system comprised of two processes and a single reliable FIFO communication channel connecting them. One of the two processes $P_s$ initiates a checkpoint by sending a marker message across the channel and recording its local state. Immediately upon receipt of the marker message, the receiving process $P_r$ saves its local state. $P_r$ guarantees it received all messages sent before $P_s$ took a checkpoint. Additionally this guarantees guarantee that $P_r$'s own checkpoint was taken before it received any messages sent by $P_s$ after $P_s$ checkpointed. The result is that when the two processes save their respective states no messages are sent but not yet received and no messages are received but not yet sent. In effect, the marker messages "flush", or "drain", the network of all messages so as to restrict the state of the distributed computation that must be recorded to that of the individual processes. This precludes any inconsistencies from arising upon restart.

The LAM/MPI message passing library is one well-known communication middleware implementation that utilizes distributed snapshots to coordinate individual process checkpoints taken with Berkeley Linux Checkpoint Restart (BLCR), which is a single process kernel based checkpoint/restart system. The LAM/MPI message passing library is discussed further in Greg Burns, Raja Daoud, and James Vaigl. LAM: An Open Cluster Environment for MPI. In Proceedings of Supercomputing Symposium, pages 379-386, 1994, and also in Jeffrey M. Squyres and Andrew Lumsdaine. A Component Architecture for LAM/MPI. In Proceedings, 10th European PVM/MPI Users' Group Meeting, number 2840 in Lecture Notes In Computer Science, pages 379-387, Venice, Italy, September/October 2003 (Springer-Verlag), each of which is incorporated herein by reference. BLCR is described in more detail by J. Duell, P. Hargrove, and E. Roman. The Design and Implementation of Berkeley Lab's Linux Checkpoint/Restart, 2002, which is incorporated herein by reference. When the LAM library desires to record the state of a distributed computation, its drains the network of all messages utilizing the marker packets, shuts down all communication channels to remove any state from the OS, and utilizes BLCR to checkpoint the local state of each individual process. The foregoing is discussed further in Sriram. Sankaran, Jeffrey M. Squyres, Bran Barrett, Andrew Lumsdaine, Jason Duell, Paul Hargrove, and Eric Roman. The LAM/MPI checkpoint/restart framework: System-Initiated Checkpointing. In Proceedings, LACSI Symposium, Sante Fe, N. Mex., USA, October 2003, which is incorporated herein by reference. The LAM library then reopens all communications channels and continues computation.

Accordingly, there are several drawbacks and shortcomings shared by current implementations of distributed checkpoint/restart based on the distributed snapshots method. Most current methods suffer from one or more of the following disadvantages: 1. Current implementations are all blocking During the detection of a global state, and while recording that global state to secondary storage, computation cannot proceed. This results in lost computational time which in turn reduces the efficiency of the distributed system. 2. Current implementations are non-transparent. The implementations require knowledge either in the user level application itself, some middleware whose primary purpose is other than checkpointing, or the operating system (OS). None of the current implementations functions as a standalone entity, completely transparent to all levels of the distributed system. 3. Current implementations do not allow for migration. Should an individual node of a distributed system fail, the process it was executing cannot be migrated to a different non-failed node, without modifications to middleware layers. As a result the distributed system cannot resume computation until the failed node is manually repaired or replaced by an operator. 4. Current implementations do not allow for truly asynchronous inducement of checkpoints. Many implementations will not allow for checkpoints to be taken during certain operations, such as many operations pertaining to communication. These implementations will need to delay the checkpoint operation until the protected operations have concluded.

BRIEF DESCRIPTION OF THE DRAWINGS

For a more complete understanding of the present disclosure, reference is now made to the following figures, wherein like reference numbers refer to similar items throughout the figures.

Figure 1:
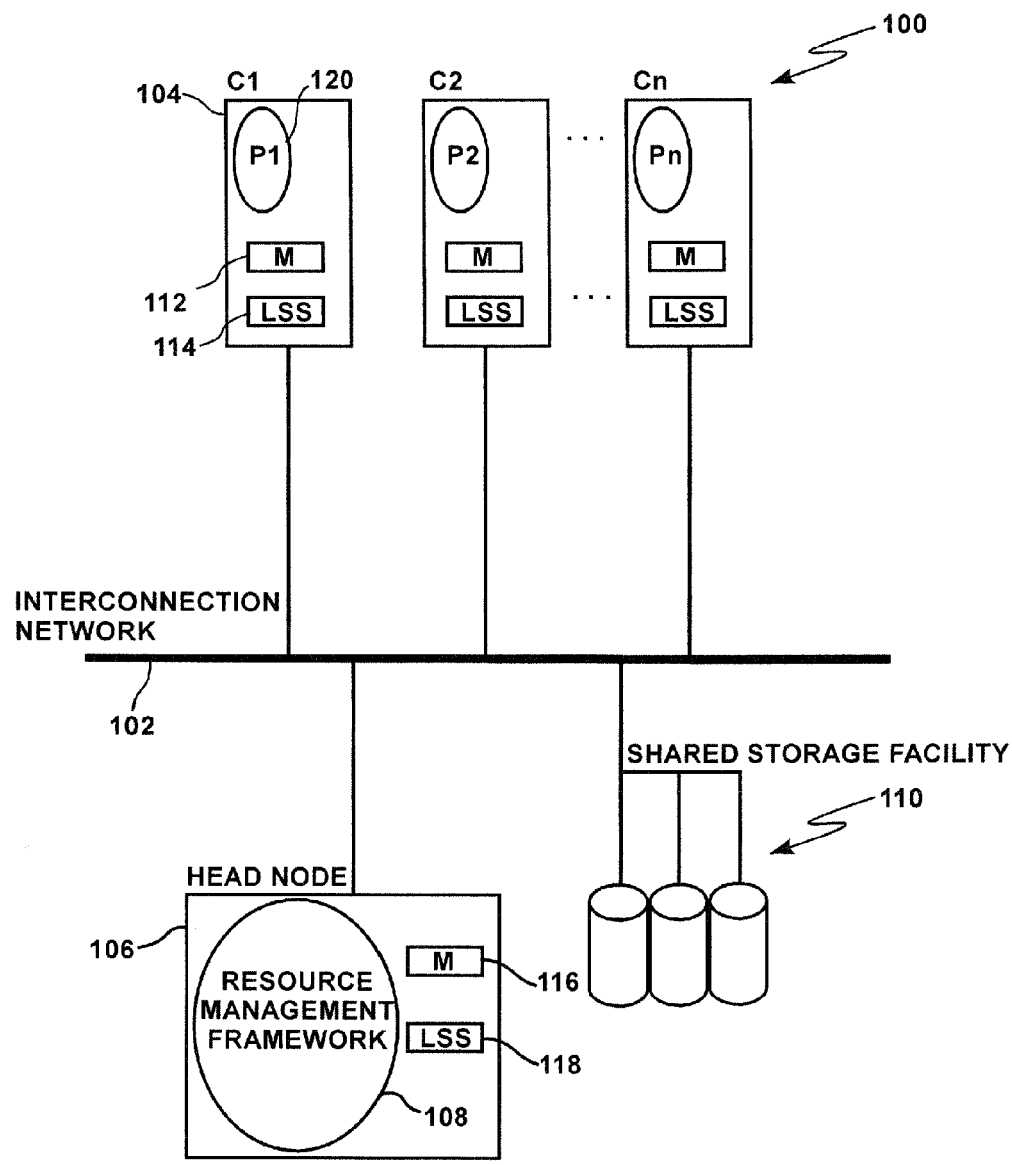
FIG. 1 illustrates a distributed computing system according to a first embodiment of the disclosure.

The exemplification set out herein illustrates particular embodiments, and such exemplification is not intended to be construed as limiting in any manner.

DETAILED DESCRIPTION

The following description and the drawings illustrate specific embodiments sufficiently to enable those skilled in the art to practice the systems and methods described herein. Other embodiments may incorporate structural, logical, process and other changes. Examples merely typify possible variations. Individual components and functions are optional unless explicitly required, and the sequence of operations may vary. Portions and features of some embodiments may be included in or substituted for those of others.

The elements that implement the various embodiments of the present system and method are described below. In some cases at an architectural level. Many elements may be configured using well-known structures. The functionality and processes herein are described in such a manner to enable one of ordinary skill in the art to implement the functionality and processes described herein.

The processing described below may be performed by a distributed processing platform. In addition, such processing and functionality can be implemented in the form of special purpose hardware or in the form of software or firmware being run by a general-purpose or network processor. Data handled in such processing or created as a result of such processing can be stored in any type of memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including existing memory technologies as well as hardware or circuit representations of such structures and of such data.

It should also be understood that the techniques of the present system and method might be implemented using a varied of technologies. For example, the methods described herein may be implemented in software running on a programmable microprocessor, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or other computer-readable medium.

A method as described herein for transparent, non-blocking detection of the global state of a non-interactive distributed computation executing on some subset of the nodes in a distributed system that enables the migration of individual processes may be combined with a distributed system to create a computing resource that may provide reliability comparable to that of a traditional supercomputer built from custom hardware. The disclosure herein provides methods and apparatus that: may be used to guarantee the consistency of a communication channel's state during a distributed checkpoint, commits the recorded state without blocking the computation, and coordinates the local checkpointing of the individual processes in such a way that the distributed system may recover from failures without manual intervention or system stoppage requiring only minimal loss of computational efficiency. The disclosure provides these methods in such a manner to permit the migration of individual processes during the course of the distributed computation. Furthermore, an embodiment may take the form of a library that can be transparently interposed (e.g., through linking) with legacy applications, middleware, and OS's, without any modification of the legacy software.

In an illustrative embodiment, a distributed system includes n computers, each of which possesses p processors, interconnected by a network. A non-interactive distributed computation is started on anywhere from 2 to n computers where each processor hosts an individual process. During the course of the distributed computation, the processes interact through the exchange of messages. This communication may be implemented by the user level application that is executing, but most likely is implemented by a middleware library (e.g., MPICH, MVAPICH, LAM/MPI) that is linked with the user level application.

Figure 2:
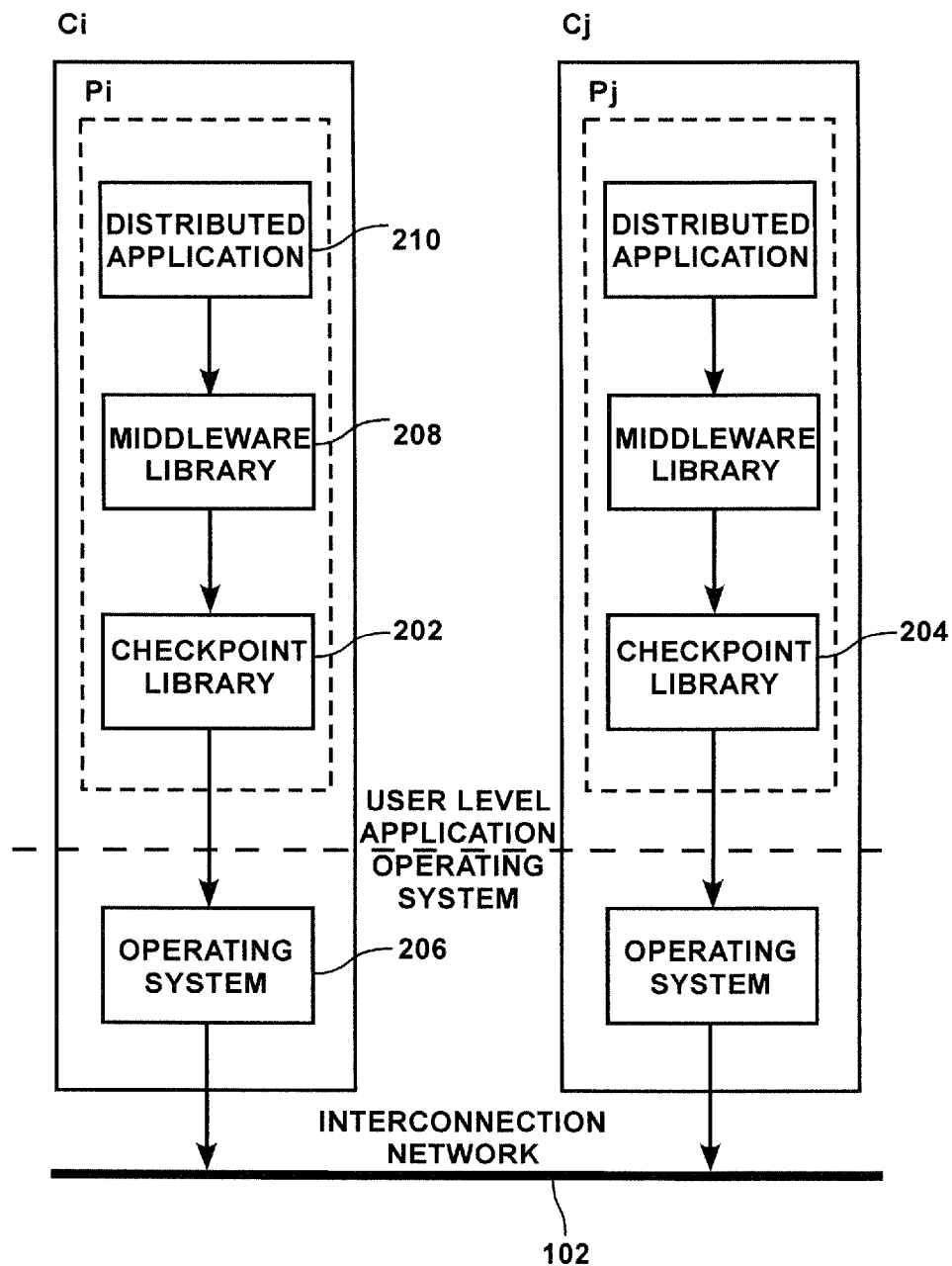
FIG. 2 illustrates layering with respect to an application, middleware, and operating system on a computing node in the distributed computing system of FIG. 1.

As illustrated in FIG. 2, a "checkpoint library" 202 may be transparently interposed "below" the process (e.g., user-level distributed application 210 and middleware library 208) and "above" the operating system (OS) 206 such that all inter-process messages, dynamic memory allocations, secondary storage access, and signal handling are processed through the checkpoint library 202.

A windowed logging protocol implemented in the checkpoint library commits (i.e., inserts) each message $m_i$ of the i messages sent by a process $P_s$ to a local log before passing $m_i$ to the OS for transmission. Messages are uncommitted (i.e., removed) from the log by the checkpoint library interposed with the receiving process $P_r$ before they are passed up to the layers above for computation. One of skill in the art will recognize that the logging method as described in the embodiments herein is implemented as an online protocol (i.e., the protocol requires no knowledge of future inputs). However, it is possible that in other embodiments a non-online protocol might be used.

In this embodiment, this uncommitting may take the form of a second small message $m_{ia}$ from $P_r$ to $P_s$ that confirms successful delivery of $m_i$. In the event of failure and subsequent restart the checkpoint library interposed with each process resends or "replays" each $m_i$ that was committed in the log when the checkpoint was taken. Should any $m_i$ have already been received by $P_r$ before the checkpoint, it is discarded without notification to the layers above and also is uncommitted from $P_s$'s log. Had $m_i$ not been received it is processed as a normal message. The windowed logging protocol precludes any inconsistency in the state of the communication channel.

Note that this embodiment differs significantly from traditional message logging in that only messages in the log are replayed. The message log only contains messages which have not been received by the intended receiver. All messages that were successfully received by the receiver and acknowledged as such are uncommitted from the message log.

During the course of execution, all dynamic memory allocations and subsequent memory modifications may be recorded by the checkpoint library through the use of a double-buffered commit list consisting of a front buffer and a back buffer. When the state of the application process is to be recorded, the front and back buffers are swapped and all modified memory regions are protected from modification. A separate thread of execution (i.e., the state recording thread) is spawned to record all of the modified memory regions listed in the previous commit list to non-volatile storage such as in shared secondary storage facility 110 (see FIG. 1). The list is traversed in order while allowing computation to proceed concurrently.

Note that in this embodiment, there is no involvement of local secondary storage 114 (see FIG. 1) in the writing to checkpoint files in non-volatile storage. Instead, all checkpoint files are stored to shared secondary storage facility 110. In other embodiments, however, other non-volatile storage approaches may be used, which may include some involvement by local secondary storage 114.

If the application process attempts to modify a region of memory listed in the previous commit list it will be detected by the state recording thread. The thread will interrupt its in-order traversal and record the region in question so as to allow computation to proceed. The region will be listed in the current commit list to ensure the new modification is recorded in the next checkpoint. This non-blocking, copy-on-write, out-of-order local checkpoint commit method reduces a checkpoint from a global synchronization operation to a local operation. It transforms the commit operation to one that is bounded by the OS memory protection mechanism as opposed to one bounded by the write access speed of the secondary storage system.

The two novel mechanisms above are described with respect to an illustrative embodiment to present a new method with which to coordinate the checkpoint of a distributed computation in such a manner that ensures a globally consistent state. This novel method is: non-blocking, transparent at all levels of the distributed computation, and performed in such a manner that processes may be migrated to any node.

The coordination can be initiated by any process through the broadcast of a "checkpoint command" to all other processes that comprise the distributed computation. A numerical id may be used to identify the interval of computation or "epoch" whose state is to be recorded. Each individual process then halts interprocess communication, commits its state (marked by the epoch id) and enters a barrier on interprocess communication. After exiting the barrier, interprocess communication resumes as part of the new interval. As recognized by one of skill in the art, a barrier is a way to synchronize the different processes taking part in a distributed computation and is a parallel operation used to hold a process until other processes taking part in the barrier have reached the barrier.

The method discussed above combined with a distributed system constructed of individual nodes may provide a supercomputing resource with the same reliability as a traditional custom supercomputer. It may allow individual processes to be migrated from a failed compute node to a properly functioning compute node in a manner that allows a distributed computation to proceed unimpeded by the mechanical or software failure of any individual nodes that comprise a distributed system. It may provide this reliability in a manner that is non-blocking and completely transparent to all levels of the distributed computation as opposed to conventional methods that require computation to halt, modification of some level of the distributed computation (e.g., user application, communication middleware, and OS) and manual intervention to restart a failed computation.

In one embodiment a runtime system provides several key enabling technologies to improve the reliability of and enable dynamic control over the execution of a distributed system. In particular, some of the main features of this embodiment are:

1. A windowed message logging mechanism that utilizes sender commits and receiver uncommits to ensure that the state of a communication channel remains consistent when a checkpoint is taken.

2. A non-blocking, out-of-order, copy-on-write protocol that can be run in a separate thread of execution to allow computation to proceed unimpeded while checkpoints are being saved to stable storage. This reduces the checkpoint operation from a global synchronization operation to a local suspension and predicates the lower bound of the commit phase on the memory protection mechanism of the OS, as opposed to the access speed of the secondary storage system.

3. A novel global state detection method that coordinates local checkpoints to guarantee a global consistency. This is accomplished in a fashion that requires no blocking of the computation and is transparent to all levels of the distributed system.

An embodiment will be illustrated below in an exemplary distributed computing system. It should be understood that however, that the system and method described herein is not limited to use with any particular type of distributed system, but is instead more generally applicable to any distributed computing environment or application in which it is desirable to improve reliability to the levels experienced in a traditional custom supercomputing environment.

As used herein, the term "distributed system" is intended to include any system which includes two or more components, either computers, machines or other types of processors. Each computer in a distributed system may be, for example, a Symmetric Multiprocessor (SMP) and contain multiple processors. The term "distributed computation" is intended to include any instance of computation that is comprised of two or more processes working in concert to accomplish a computational task. The term "process" as used herein is intended to include any type of program, instruction, code, or the like which runs on one or more computers or other types of processors in a distributed system.

The processes that comprise a distributed computation may cooperate either through the explicit exchange of messages over an interconnection network, the access and modification of memory regions that are shared by all processes, or some combination thereof. In the present embodiment all processes execute concurrently on distinct separate processors and each process will be illustrated as an OS process. The system and method discussed herein is not limited to such an environment however, and may be utilized regardless of the manner in which instances of computation are realized (e.g., user level threads, kernel level threads, and OS process).

As used herein, the term "local checkpoint" is used herein to describe the recording of the set of information that fully characterizes the state of a single process contributing to the execution of a distributed computation. The term "checkpoint" is used herein to describe the aggregate set of local checkpoints which represents a globally consistent state of a distributed computation. The term "checkpoint interval" refers to the period of normal computation and communication that takes place between two checkpoint operations. The term "head node" refers to a special component in a distributed system on which distributed computations are submitted by users for execution and on which may run central monitoring and resource administration software. The term "compute node" refers to a single node in a distributed system that contains n processors (where n.gtoreq.1) and therefore may host n processes.

When a distributed computation is initiated on a conventional distributed system the execution of the individual processes starts on a subset of the compute nodes. Should a hardware or system software failure occur on any one of those compute nodes, the distributed computation halts. Most conventional distributed systems provide no checkpointing mechanism, and the distributed computation must be restarted from the initial point of execution. Should the distributed system utilize a distributed snapshots based mechanism to checkpoint distributed computations, the failed node must be repaired through manual examination and maintenance prior to the restart of the distributed computation.

Even in the presence of sophisticated system software to automate the monitoring and maintenance of a compute node, hardware failures still necessitate the manual intervention of a system administrator for a non-trivial number of node failures. The distributed computation resumes at the state of execution recorded by the most recent checkpoint, on the exact subset of compute nodes that it was originally running on. Local checkpoints taken by a distributed snapshots based mechanism flush communication channels without capturing any of the state maintained in the OS and middleware and hence do not allow migration. Open communication channels depend on sockets or some other equivalent system level interface that are tied to specific network or hardware level addresses (e.g., IP addresses or Infiniband connection state).

Further inspection of the requirements reveals significant drawbacks in the distributed snapshots based checkpointing mechanism for the majority of conventional distributed systems. Most distributed systems actually execute a number of distributed computations concurrently, each utilizing a subset of the compute nodes. Should one of the compute nodes fail, the distributed computation it was taking part in halts and the remaining, properly functioning, compute nodes in the subset become idle. In a distributed snapshots based checkpointing system, these compute nodes must remain idle until the failed node is repaired so that the distributed computation may resume execution on the exact subset of compute nodes it was originally running on. The amount of time that the non-failed nodes in the subset remain idle results in a waste of resources, adversely effecting the efficiency of the distributed system.

The alternative is to allow the non-failed compute nodes to take part in other distributed computations, while waiting for the failed node to be serviced. Unfortunately, there is no upper bound on the amount of time it may take for the now fragmented original subset of nodes to simultaneously become available to resume the failed distributed computation. In such an environment there is no guarantee failed distributed computations will ever complete. In contrast, the present embodiment may take advantage of the high probability that at any given time in a distributed system a small number of compute nodes will be idle for lack of a combination of distributed computations that precisely utilizes all of the compute nodes. As a result, if one of the compute nodes actively taking part in a distributed computation should fall, the process(es) it hosted can be migrated to one of the idle "hot-spare" compute nodes. Additionally a system administrator may explicitly reserve a set of compute, nodes to ensure that hot-spares are always available. The distributed computation is then able to continue unimpeded. Should the distributed system be used to execute a single distributed computation that consumes the entire set of compute nodes, it is left to the administrator to reserve a handful of nodes for fail-over purposes. It can be shown that the efficiency lost through this method is far less than the loss due to failures in a conventional distributed system.

This embodiment provides a method for detecting the global state of a distributed computation and transparently acquiring local checkpoints of each process taking part in the computation in a manner such that the aggregate is globally consistent and local checkpoints are migratable. The embodiment may record local checkpoints with a novel out-of-order copy-on-write mechanism that allows computation to proceed during the course of a local checkpoint. The embodiment may be configured such that a distributed computation may be checkpointed and have some subset of its processes migrated for any or all of the following reasons: (1) a compute node failure occurs, either due to hardware failure, system software error, or any other itinerant failure that interrupts the process(es) executing upon it; (2) a system administrator wishes to remove a number of compute nodes from the distributed system for maintenance or upgrades without disrupting the distributed computations taking place; (3) an intelligent scheduling entity, managing the resources of the distributed system and utilizing a preemptive scheduling algorithm, wishes to temporarily halt a distributed execution to allow its compute nodes to be used for another computation; or (4) application software written with advance knowledge of the embodiment specifies a checkpoint at a point in execution (e.g., end of a time step) where the amount of state required to be saved is minimal (e.g., a user-directed checkpoint).

When a distributed application is to be preempted, each instance may be sent a signal that is asynchronous to the computation in progress. This signal may be either a true OS signal or an out-of-band message. On receiving the signal, the checkpoint operation is initiated. Once the checkpoint operation has completed, a scheduling entity (executing a preemptive scheduling algorithm) may use OS facilities to halt or terminate the distributed computation. The scheduling entity is then able to instantiate another computation on the compute nodes that have been idled.

FIG. 1 shows an exemplary distributed computing system 100 in which a first embodiment of the disclosure may be implemented. The system 100 includes a group of compute nodes 104 (designated as C.sub.1, C.sub.2, . . . , C.sub.n) connected through some form of interconnection network 102 to a head node 106 (designated as H) upon which some central resource management software 108 (indicated as resource management framework in FIG. 1) may be executing. Typically, head node 106 is not a compute node. However, in other embodiments, a compute node could be used to serve as the head node.

Interconnection network 102 may be, for example, an Internet-based network. One or more processes 120 may be executed on each compute node 104. For example, a process P.sub.1 may run on compute node C.sub.1, and a process P.sub.n may run on compute node C.sub.n. Each process 120 may be executed, for example, by one or more processors (e.g., an INTEL ITANIUM microprocessor) included in compute node 104.

The compute nodes 104 in the system are also connected to a shared secondary storage facility 110 (designated by S). The shared secondary storage facility 110 may be, for example, an NFS file system available over interconnection network 102 or a more advanced parallel file system such as the LUSTRE system. With respect to secondary storage facility 110, the same file system should be visible to any of the compute nodes 104 that are to be migration targets. In a typical embodiment, shared secondary storage facility 110 is accessible by all compute nodes 104.

Each compute node 104 may include local memory 112 (e.g., dynamic RAM), which may be used, for example, to store user-level applications, communications middleware and an operating system, and may also include local secondary storage device 114 (e.g., a hard drive). Local memory 112 may also be used to store messages, buffers and logs associated with the checkpoint method described herein, as discussed in more detail below. Head node 106 may also include local memory 116 and local secondary storage 118.

The compute nodes C.sub.1, C.sub.2, . . . , C.sub.n may be computers, workstations, or other types of processors, as well as various combinations thereof. It will be assumed for purposes of illustration that in the system requests for distributed computations will arrive at H and be dispatched to an idle subset of the compute nodes. In such a system not using the novel methods described herein, if there does not exist an idle subset of the compute nodes large enough to satisfy the request it will be queued by the resource management framework on H for execution at a later point in time when such a subset can be found. The resource management framework may attempt to reorder the queued request to minimize the number of compute nodes that are idle, but once a distributed computation has been launched it generally must be allowed to run to completion. It should be noted that the distributed computations are typically non-interactive.

Referring to FIG. 2, a user-level checkpoint library 202 is, for example, linked either statically or at runtime against the application 210 that performs the distributed computation. Any middleware 208 may also be linked to the application in the same manner. This embodiment may transparently integrate with user level applications and middleware by, for example, providing strongly aliased symbols with the same signature as key system library calls. The linker/loader then redirects the execution flow of the system calls through the checkpoint library.

FIG. 2 illustrates the manner in which the checkpoint library 202 may fit into the application 210/middleware 208/OS 206 stack found in a conventional distributed system. The user-level checkpoint library 202 is transparently interposed into the process comprised of user-level application 210 and middleware 208, and through the use of, for example, redirected system calls, sits "below" the user-level application and any middleware in use, and "above" the OS. No awareness or knowledge of the existence of checkpoint library 202 is required in any of the application, middleware or OS. Distributed application 210, middleware library 208, checkpoint library 202 and operating system 206 may be stored, for example, local memory 112.

Checkpoint library 202 is illustrated in FIG. 2 associated with a process $P_j$ running on compute node Ci. Another checkpoint library 204 may be associated with a process $P_j$ running on compute node $C_j$. In the typical case, checkpoint libraries 202 and 204 are copies of the same library when initially loaded. In general, each compute node 104 will include a checkpoint library in the user space associated with the compute node.

The windowed logging protocol may be used to ensure that the state of a communication channel and the two processes at either end remains consistent during a checkpoint. This approach is not obvious when considering the assumptions made by those using conventional distributed snapshots based systems. The distributed snapshots method assumes that all communication channels are reliable FIFO queues and so drains them of any state prior to checkpointing. Conventional methods thus do not record the messaging state tied to the reliable communication framework provided by the OS, including hardware specific addresses and current connection buffers, thereby preventing migration.

In contrast, the present embodiment uses a general operating assumption that all communication channels provided by the OS are inherently unreliable (e.g., providing no guarantee of delivery or correctness of order). As stated above, all communication operations invoked by either the application or middleware may be directed to the checkpoint library. These operations are carried out utilizing the communication primitives provided by the OS. As OS channels are assumed to be unreliable, the present embodiment may ensure correct delivery of messages through use of the windowed message logging protocol.

Figure 3:
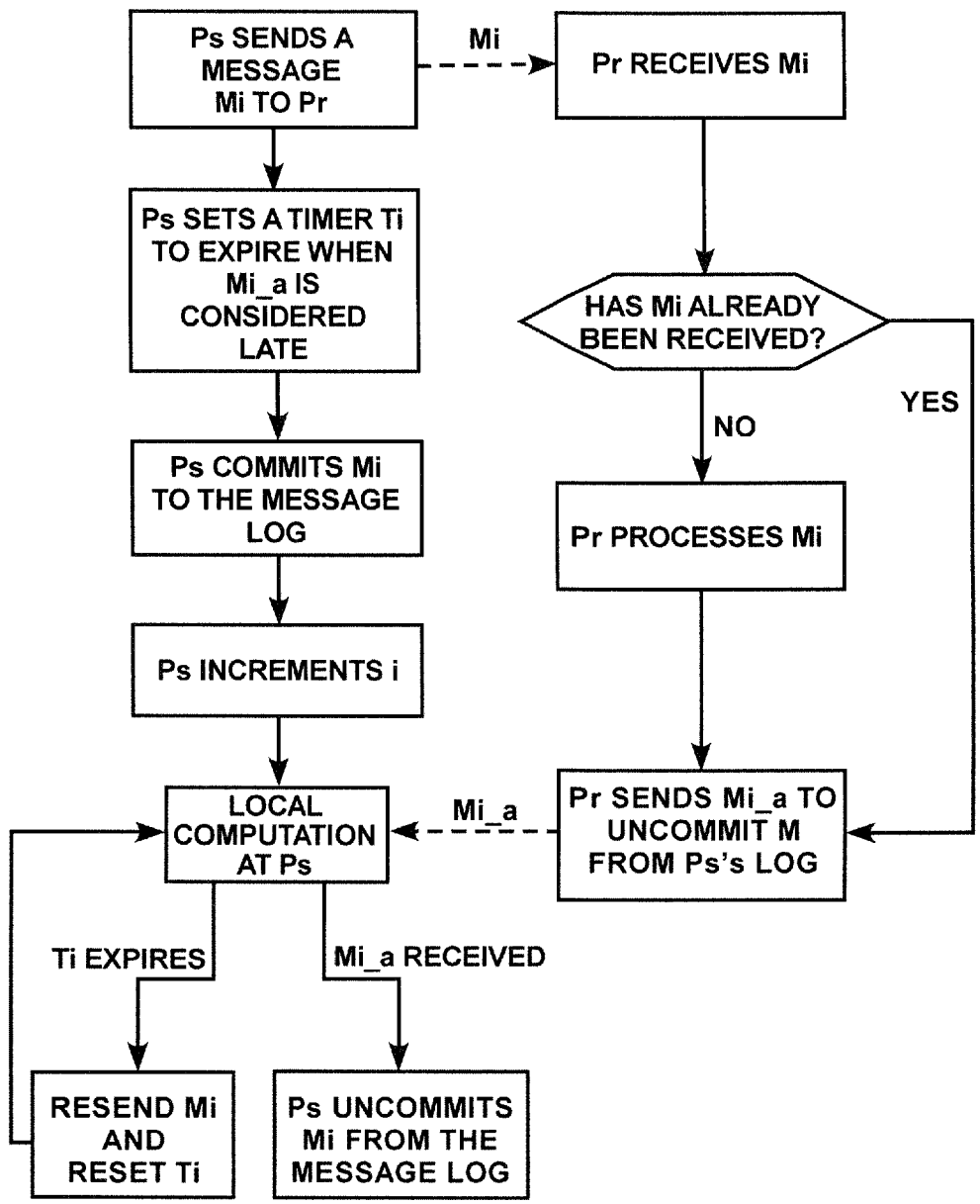
FIG. 3 is a flowchart of a windowed message logging process that may be used with the first embodiment.

FIG. 3 provides a flow diagram of the method used by the windowed message logging protocol. The sender $P_s$ commits a message to a local log prior to transmission. The local log may be stored, for example, in local memory 112 of each compute node using the logging protocol.

Upon receipt of the message the receiver $P_r$ replies with a short acknowledgment message to inform $P_r$ of successful delivery. This action taken by $P_r$ uncommits the message from $P_s$'s log. A unique monotonically increasing sequence number may be associated with each message so that messages received in the wrong sequence may be reordered property by $P_r$. The sequence numbers also allow a receiver to detect that a message was lost (e.g., a gap in sequence numbers of messages received), as well as the receipt of duplicate messages. Duplicate messages are discarded (since they were already received and processed), while lost messages may be dealt with by requesting their retransmission. Messages that are listed in the sender log are known as "outstanding" messages.

In order to permit the use of a finite buffer for the log, a limit may be placed on the number of outstanding messages that are allowed at any one time. Should this limit be reached, $P_s$ will cease sending messages until the oldest outstanding message is acknowledged. The range of sequence numbers that is allowed to be outstanding is known as the "transmission window", and as messages are sent and received the transmission window in essence slides over the total set of messages that the application and middleware request to be transmitted.

The present embodiment implements communication in the manner described above and, as mentioned, assumes that the communication channel which starts at $P_s$'s interface to the OS and ends at $P_r$'s corresponding interface is unreliable. It should be noted that in such an environment, it is generally not possible to determine whether the loss, out-of-order delivery, or duplication of a message is due to a failure of the OS, the failure of the interconnection network, the failure of the OS on the node at the remote end of the communication channel, or even the failure of the process executing on that remote end. Accordingly, the present embodiment does not checkpoint state within the OS or in-flight over the communication fabric. Nor does the present embodiment engage in coordinated "flushing" of messages out of the OS and communication fabric before checkpointing as do conventional systems. Rather, the windowed message logging implemented by the user-level library of this embodiment masks any loss of state within the operating system and the interconnection network during the checkpoint operation as a message loss that would be dealt with in the normal flow of communication over an unreliable channel.

As discussed above, a deterring factor in aggregating the local checkpoints from $P_s$ and receiver at either end of a communication channel into a globally consistent checkpoint is an inherent difficulty in preventing inconsistencies in the communication channel state from occurring upon restart. In a conventional distributed system the inconsistencies that may arise when checkpointing while $P_s$ is sending a message m to $P_r$ are as follows:

1. Message m was sent prior to the local checkpoint taken by $P_s$, but received after the local checkpoint taken by $P_r$.

2. Message at was sent after the local checkpoint was taken by $P_s$ but received prior to the local checkpoint taken by $P_r$.

3. As the embodiment also adds a secondary acknowledgment message $m_a$ from $P_r$ to $P_s$, there is a third possible inconsistency when $P_r$ checkpoints after sending $m_a$, whilst $P_s$ checkpoints before receiving the acknowledgment.

Use of the novel windowed logging method described herein may avoid the above failure modes.

In the first failure mode, $P_s$ is restarted in a state prior to m having been sent and sends m as part of the normal flow of execution. $P_r$, having been restarted in a state where m has already been received, receives m again, resulting in an inconsistent global state. The windowed logging protocol may prevent such an occurrence by recognizing from the sequence number associated with m that the message is a duplicate and discarding it. The receiver then uncommits m from $P_s$'s message log by replying with $m.sub.a$.

In the second failure mode, when $P.sub.s$ is restarted in a state after having sent m and $P.sub.r$ is restarted in a state prior to the receipt of m, the message m will never be received by $P.sub.r$. The windowed logging protocol prevents the permanent loss of messages. As m is never received, $P.sub.r$ will never send $m.sub.a$ to uncommit m from $P.sub.s$'s log. After a certain period of time t has elapsed, m will "timeout" at $P.sub.s$ and be resent $P.sub.r$ will now receive the second transmission of m and uncommit it from $P.sub.s$'s log by replying with $m.sub.a$. An appropriate value for t is set based on the bandwidth and latency of the specific interconnection network utilized by the distributed system.

In the third failure mode, when $P.sub.s$ is restarted in a state prior to having received $m.sub.a$ and $P.sub.r$ is restarted in a state after $m.sub.a$ has been transmitted, m will never be uncommitted from $P.sub.s$'s log. Such an occurrence may be prevented through the use of a windowed logging protocol. After a certain period of time t has passed, m will "timeout" at $P.sub.s$ and be resent. $P.sub.r$ will now receive the second transmission of m, recognize from the sequence number that it is a duplicate, and send a second copy of $m.sub.a$, thereby uncommitting ft from $P.sub.s$'s log.

The windowed message logging protocol may be used to provide another fundamental advantage over conventional distributed snapshots systems. The present embodiment provides a distributed system with the ability to transparently migrate an individual process to a different compute node. As stated above the conventional distributed snapshots method prevents inconsistencies by using marker messages to flush the network of all messages sent prior to checkpointing. While this approach results in a globally consistent checkpoint, it does not capture any of the state maintained by the communication middleware or OS, including but not limited to open connections bound to specific hardware addresses. In any type of transparent distributed snapshots system this precludes any type of migration, as any remote process will attempt to communicate with the migrated process using the address of the original node it was executing on. Some distributed snapshots systems attempt to work around the problem by leaving a small "forwarding" process $P.sub.f$ on the original node. $P.sub.f$ receives all traffic at the original node intended for the migrated process and forwards it to the new location. However, this model does not address fault tolerance as any failure precludes the execution of $P.sub.f$.

In order for a distributed snapshots based system to provide migration for fault tolerance, it must modify either the communication middleware or the OS. A prominent example of such a system is the communication middleware (e.g., LAM/MPI) which has special code to implement a distributed snapshots protocol and integrate with a third party single process checkpoint system. This type of arrangement is undesirable as it ties user applications to a specific implementation of a messaging-passing API, thereby defeating the primary motivation for a general message-passing specification. OS modification is even more unfeasible as many distributed systems run general purpose OS's that would require manual modification by system administrators.

It is generally desired that all facets of checkpoint/restart, including migration, are be transparently handled by a stand-alone framework, requiring no modification of user applications, middleware, or operating systems. The disclosure herein may permit the providing of such transparent migration as a benefit of the windowed message logging protocol above. All inter-process communication is redirected through the checkpoint library in order to implement the logging protocol. As the embodiment handles all communication, all that is required to enable migration is redirect all communication intended for a given process to the node to which it has been migrated. To ease the implementation of this method, the present embodiment may virtualize network addresses, meaning that all application and middleware requests for OS communication interfaces are satisfied with addresses that the present embodiment provides. Internally, these addresses may be mapped to the actual hardware addresses of the compute nodes. When a migration occurs, the checkpoint library modifies the mapping accordingly. In such a manner, the present embodiment is able to provide transparent support for process migration.

In order to locally checkpoint a process the method records the following: (1) a process's global and static data, (2) its processor context (contents of the registers), (3) its stack, and (4) all dynamically allocated memory. The first three components are of a known size and can be recorded by simply writing their values to stable storage.

The last component, dynamically allocated memory, may refer to both memory allocated out of a common area (e.g., the heap), or memory that is "mapped" in regions whose size is a multiple of a unit size (usually an operating system page). Although it is possible to simply record all the dynamically allocated memory regions with each checkpoint, the typical distributed computation utilizes large amounts of memory and would require substantial amounts of disk access with each checkpoint. It is more desirable to only checkpoint the memory regions that have been modified in the interval since the last checkpoint, creating an ordered set of "incremental" checkpoints. To achieve this, the checkpoint library may be transparently interposed in the control path of all allocations.

To determine which memory regions need to be stored as part of a local checkpoint, the present embodiment utilizes an incremental change detection method similar to that, for example, found in James S. Plank, Micah Beck, Gerry Kingsley, and Kai Li. Libckpt: Transparent Checkpointing Under Unix. Technical Report 1994, which is incorporated herein by reference, or similar to that, for example, of other conventional single process checkpointing methods.

All dynamically allocated memory is write protected and any attempts by the application or middleware to modify protected memory results in a segmentation violation. The signal handling of the process is interposed to redirect signal notification of segmentation violations to the checkpoint library. The checkpoint library determines if the segmentation violation was due to a modification of write-protected memory or an actual segmentation violation incurred by the application or middleware. True segmentation violations are passed to the system error handling routines. If the violation was due to a modification of write-protected memory, the region of memory that contains the modification is marked in a commit list as having been modified. The write protection is removed and the application's normal flow of execution proceeds with all future modifications to the region ignored until the next checkpoint. A region in the commit list is checkpointed in the presence of any modification regardless of the number of modifications in a checkpoint interval.

When the time comes to take a checkpoint computation is suspended and the commit list is traversed in order, and all of the regions of memory that have been modified in the interval since the last checkpoint are recorded. The suspension of computation prevents regions in the commit list from being changed during their storage into non-volatile memory. In this incremental checkpointing approach, the present embodiment determines the minimal amount of dynamically allocated memory that must be recorded. The size of a region of memory that is marked is, for example, a discrete multiple of the smallest sized region of memory that the OS's memory protection mechanism will operate on. On many OS's this is, for example, a page. Note that the granularity of the memory region size (e.g., one or a multiple of pages) may be varied in order to improve performance.

The incremental checkpoints may be, for example, stored as a series of files, or as a set of incremental changes to a single double-buffered checkpoint file. An advantage of a double-buffered file is that a failure in the middle of a checkpoint operation will not result in a corruption of previous checkpoints.

This suspension of computation becomes problematic when considering that incremental checkpointing may require that the amount of memory to be recorded for each checkpoint may be large, sometimes requiring all dynamically allocated memory to be stored in every checkpoint. This pathological case can be common in the HPC applications that distributed systems are often used to execute. For instance, in applications that solve large systems of linear equations using matrices, the matrices are spilt into pieces (e.g., sub-matrices, columns, and rows) and each process operates on a piece. Many common matrix operations modify the value of every item in the matrix, and as such would require the entire matrix to be checkpointed. Factoring the relative speeds of the processor and access to the non-volatile storage subsystem, processors in a distributed system can spend significant amounts of time idling, waiting for checkpoints to be written to storage. This blocking problem is exacerbated as the distributed computation will not resume until every node has finished storing the memory regions listed in its commit list and resumes local computation. These limitations transform the checkpoint operation of a conventional system into a de facto global synchronization whose lower bound is determined by the slowest process.

Figure 4:
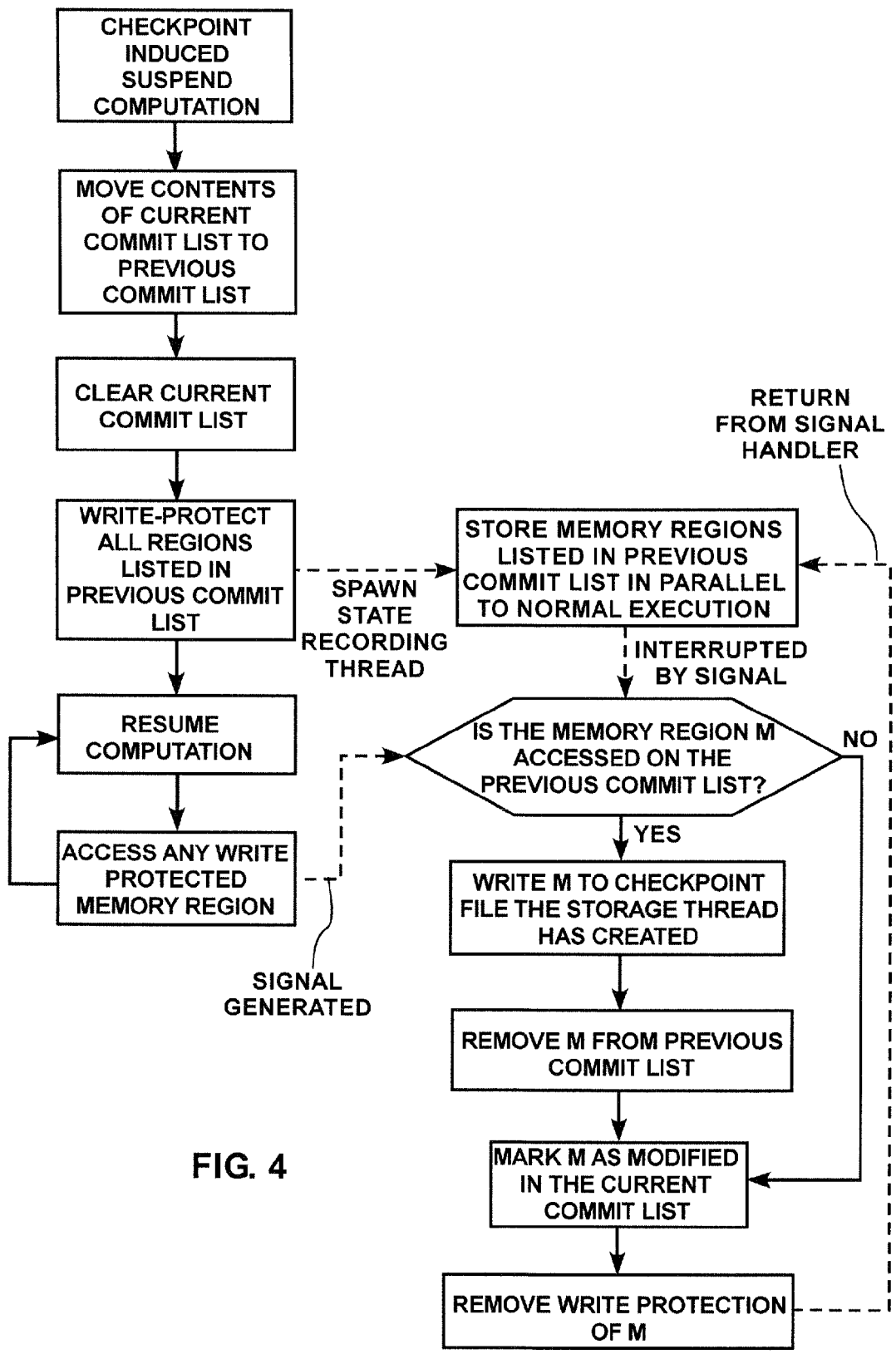
FIG. 4 is a flowchart of a non-blocking method to store checkpoints that may be used with the first embodiment.

To reduce the operation of committing a checkpoint from a global synchronization operation to a non-blocking local operation whose runtime is not bounded by the access speed of the non-volatile storage system, this embodiment may make use of a novel non-locking, copy-on-write, out-of-order checkpointing approach described by the flow diagram of FIG. 4. As stated above, conventional single process checkpointing systems utilize a commit list to track which memory regions have been modified in the previous checkpointing interval. The present embodiment may utilize a novel double-buffered commit list where the first buffer contains the previous commit list L.sub.p and the second buffer contains the current commit list L.sub.c. During a checkpoint interval, all detected modifications may be listed in L.sub.c. When the checkpoint operation is invoked, the local process to memory is briefly suspended, the contents of L.sub.c is swapped with those of L.sub.p, and the regions of memory listed in L.sub.p are write protected.

Note that although the embodiment described below discusses the swap as taking place prior to memory protection, in other embodiments the swap could be done after write-protecting the memory regions while they are located L.sub.c. The buffer, whether L.sub.c or L.sub.p, that contains the regions to be protected depends on when during the freeze period the buffers are swapped. If the swap occurs before write-protecting, the regions are found in L.sub.p during the protection phase, as discussed in the embodiment below. The write protection is performed prior to exiting the freeze period.

FIG. 4 illustrates clearing of the current commit list after moving the contents of the current commit list to the previous commit list. Note that clearing of the commit list helps to ensure that subsequent checkpoints are of the minimal size.

The double buffer itself may be implemented with any suitable data structure such as, for example, a linked list. The swap is implemented quickly by recording the address in memory that the two buffers are located at and simply exchanging the two addresses when we want to "swap" the buffers. A second thread of execution is spawned off to begin recording the contents of all memory regions listed in L.sub.p and the application is allowed to resume computation interleaved (i.e., occurring in parallel) with the checkpoint storage operation. After a memory region is recorded, its listing is removed from L.sub.p. Should the interleaved computation attempt to modify a memory region, that modification will be detected, and the present embodiment will determine if it is a region listed in L.sub.p. If the region is found listed in L.sub.p, the recording thread's traversal of L.sub.p is interrupted to perform an out-of-order recording of the memory region to secondary storage. This ensures that the checkpoint that was in the process of being recorded remains consistent. The memory region is added to L.sub.c, as the modification in question will need to be recorded in the next checkpoint. Write-access to the region is restored and application execution allowed to proceed. With this method the global consistency of a checkpoint may be assured, while allowing the interleaving of application execution with checkpoint I/O operations. It should be noted that the manner of data structure used to represent the buffers is irrelevant, and generally differentiates only in the efficiency with which the memory regions are listed and traversed.

Note that the regions to be write-protected are found in the region double buffer L.sub.p/L.sub.c. The double buffer does not need to be write-protected itself since the double buffer is allocated and maintained by the checkpointing library. The memory regions containing the logs for the windowed message logging are write-protected and will be listed in the double buffer.

An advantage of this novel approach is that the suspension of the application is now a local operation and the checkpoint phase no longer requires a global synchronization. The second fundamental advantage to this approach is that the duration of the suspension is relatively short, since at only includes the time required to write protect the memory regions as opposed to recording the actual contents of the modified memory regions, an operation whose duration has a lower bound determined by the access speed of the non-volatile storage system, which can be orders of magnitudes slower than the speed of computation. The out-of-order copy-on-write mechanism prevents any of the regions listed in L.sub.p from being modified prior to being recorded. The write protection in effect becomes the "commit" operation rather than the actual recording of memory regions to, for example, a hard disk.

Figure 5:
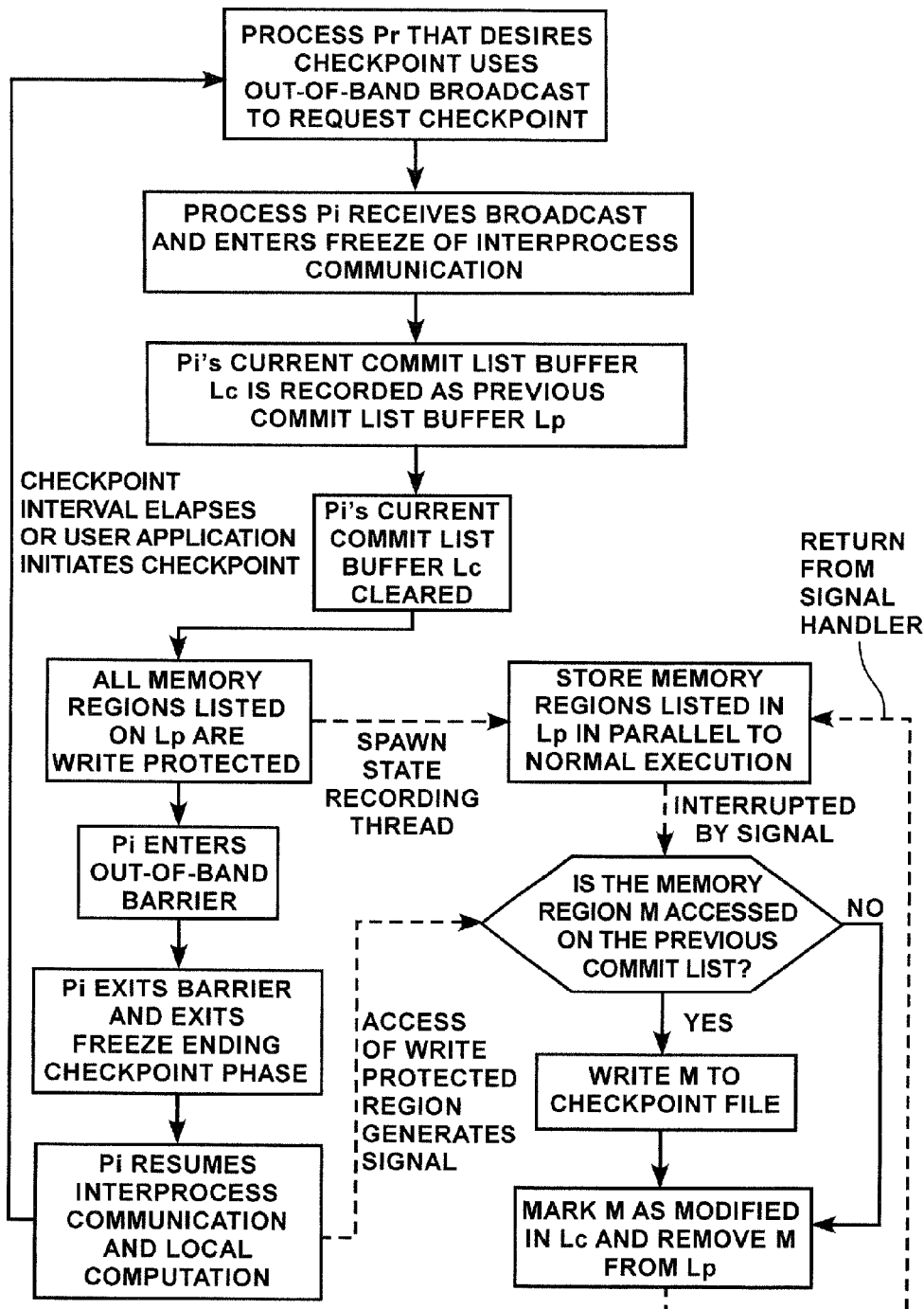
FIG. 5 is a flowchart of a distributed checkpoint coordination method that may be used with the first embodiment.

The embodiment discussed herein may be used to assist in circumventing problems that may arise when utilizing conventional distributed checkpointing systems and provides a novel non-blocking global checkpoint coordination method that is generally not possible in conventional systems. FIG. 5 illustrates the steps that may be taken by the present embodiment to checkpoint a distributed computation. It will be assumed for purposes of illustration that the computation is proceeding with checkpoints taken at regular intervals it should be noted that the system and method disclosed herein is not limited to such a usage pattern and that the checkpointing strategy may be regularly scheduled, arbitrary user-directed, or a combination thereof.

After one of the intervals has elapsed, some process P.sub.root will initiate the checkpoint operation by broadcasting a checkpoint command to all processes taking part in the distributed computation. P.sub.root may be any one of the processes taking part in the computation (e.g., a user-directed checkpoint) or another process executed on head node 106 such as, for example, a scheduling entity or resource management framework software (e.g., LSF, PBS Pro, and Sun Grid Engine). The broadcast command will contain the epoch identifier associated with the current checkpoint operation.

Upon receiving the broadcast each process P.sub.i will enter a "freeze" period. During the freeze period, all interprocess communication and computation is suspended. The windowed message logging protocol ensures that any messages discarded during the freeze are not lost. After freezing, P.sub.i will utilize the double-buffered commit list and swap the contents of L.sub.p and L.sub.c, before write-protecting the memory regions listed in L.sub.p. The out-of-order copy-on-write ensures that P.sub.i is now able to consider its state from the previous interval committed and spawn off the storage thread of execution. P.sub.i exits the checkpoint operation by entering an out-of-band barrier. The barrier operation is expected to normally occur quickly, since all processes of the distributed system involved in the computation typically receive their checkpoint broadcast separated by no more than the interconnection network latency, and hence enter the barrier separated by a delay usually bounded by the network latency.

In order to implement the barrier, each process P.sub.i will notify the initiating process P.sub.root out-of-band that P.sub.is state has been committed. When P.sub.root receives a commit confirmation from each P.sub.i included in the computation, it will transmit an out-of-band broadcast declaring the interval finished. Upon receipt of this broadcast, P.sub.i exits the barrier, the freeze is lifted, and P.sub.i resumes inter-process communication and computation. Note that the barrier is not necessary for the correct operation of this embodiment. The barrier merely ensures that all processes involved in the distributed computation have received and processed the checkpoint message, in particular that all processes are operating at the same epoch.

The "current epoch" identifier is a monotonically increasing 64-bit quantity of which each process maintains its own local copy (e.g., as a value in local memory). Each process increments this local copy after exiting the global checkpoint operation and prior to resuming local computation and inter-process communication. The incremental checkpoint files may be ordered and identified using this epoch identifier. The only time at which two processes may have different values for the current epoch is during the global checkpoint operation when processes that have exited the operation have a current epoch that is one greater than the processes still taking part in the global checkpoint operation.

If for any reason at any time during a checkpoint interval any two processes in the distributed computation are operating at different epochs, this fact may be detected as a failure. The process which detects this failure will broadcast an exception, and the distributed computation may be rolled back to its most recently known globally consistent checkpoint. The presence of the barrier merely accelerates the detection of this failure mode. The above embodiments entire checkpoint phase may be only loosely coordinated, and it typically may last only a fraction of the period of time necessary to commit the actual contents of modified memory to secondary storage.

Now briefly discussing some concepts regarding global consistency that are believed to be applicable to the embodiment described above, consider a distributed computation comprised of n processes. A global state of the system can be abstractly defined as the union of the individual state of each process P.sub.i and the state of the communication channels. For the purposes of this brief discussion, ft is assumed that the distributed system is a message passing system. However, it should be noted that the discussion is also applicable to shared memory systems where communication between processes is facilitated through the modification of shared memory locations. For a distributed computation running on such a system, the global distributed state S.sub.G can be more formally defined as:

$$S_G = \bigcup_{i=1}^{n} S_i + \{_{i=1}^{n} \bigcup_{j=1}^{n} C_{ij}. \text{noteq}.j\} \quad \#\#EQU00001\#\#$$

where S.sub.i represents the local state of P.sub.i and C.sub.ij represents the state of the communication channel between two processes P.sub.i and P.sub.j. C.sub.ij can be further reduced to a set of messages M.sub.ij where each message m has been sent by either P.sub.i or P.sub.j and not yet received by the corresponding process. With the use of the windowed message logging mechanism, every message m may be committed to the senders log and if already received may be stored in the receivers state. This implies that the state of the communication channel C.sub.ij is completely contained in the local states S.sub.i and S.sub.j. The global distributed state then reduces to:

$$S_G = \bigcup_{i=1}^{n} S_i \quad \#\#EQU00002\#\#$$

The role of each process P.sub.i in the global checkpoint operation has been reduced to executing a local checkpoint operation to record S.sub.i. In order to ensure the consistency of S.sub.G, no state S.sub.i may change during the local checkpoint operation. More specifically upon entering the global checkpoint operation no process P.sub.i may change its local state or the state of any other process P.sub.j until the global checkpoint operation is finished. The only self-inflicted cause of local state change is local computation. Likewise the only manner for P.sub.i to change the state of P.sub.j is to send a message.

Given these criteria, recall that upon entering the global checkpoint process, P.sub.i stops local computation and enters a "freeze period" during which all interprocess communication is suspended. P.sub.i then executes the local checkpoint operation and exits the global checkpoint operation by entering the loosely synchronized out-of-band barrier operation. At no point during its part in the global checkpoint operation does P.sub.i alter its own state or send a message to any process P.sub.j that would alter S.sub.j. While in the loosely synchronized barrier operation P.sub.i resumes local computation but still refrains from any inter-process communication. This ensures that P.sub.i does not alter the state of any process P.sub.j that may still be taking part in the global checkpoint operation. Only after every process enters the loosely synchronized barrier, which subsequently terminates, does P.sub.j resume interprocess communication. Using the foregoing approach provides the global consistency of all global checkpoints taken.

The embodiment described above may be used to implement a preemptive scheduling system capable of providing maximum flexibility when implementing a resource sharing policy. The preemptive scheduler preferably should use a user-level transparent windowed message logging based checkpointing framework such as described above to record the state of executing jobs. When the resource sharing policy dictates that one computation is to be suspended and another started or resumed in its place, the embodiment described above may be used to checkpoint the executing computation before halting it. A second computation that may be a new computation or one resumed from a checkpoint will be executed.

By using a transparent windowed message logging based method, migration of individual processes may be permitted and no restrictions are placed on the physical location of processes in the distributed system. This enables the scheduler to preempt and resume computations according to a resource sharing policy bounded, for example, only by the total capacity of the distributed system. The preemptive scheduler may also take a relative priority of each computation into account by varying the length of an individual computation's interval of execution. The preemptive scheduler is generally not required to account for the spatial locality of processes being preempted and resumed, although it should be noted that the spatial locality may be configured to minimize the latency of the communication channels used by the cooperating processes.

A specific example of one approach is described by the following steps;

Execute a monitoring process or daemon on each compute node in a distributed system.

Execute on the head node or one of the compute nodes of the distributed system a scheduling process that allows users to queue distributed computations for execution on the distributed system.

Link applications against a user-level checkpointing library that is transparent to the application, communication middleware and operating system and that virtualizes network/hardware addresses using a mapping of virtual to network/hardware addresses.

Initiate a distributed computation by sending a message to the daemon residing on each node being utilized in the distributed computation. The daemon will initiate a new operating system process to begin execution of the application. After a period of computation, broadcast a checkpoint message to the monitoring daemon on each compute node taking part in the computation. The daemon will induce the process to checkpoint its state. This inducement may take the form of, but is not limited to, an operating system signal, a modification to a shared memory location, or a message sent over an out-of-band communication channel.

Checkpoint the process with a method that uses a windowed message logging protocol to ensure that the set of local checkpoints results in a consistent global state and that the suspended process may be migrated to any other node in the system.

After all the daemons have sent notification of a successful checkpoint back to the scheduling process broadcast a kill message to the monitoring daemon on every compute node taking part in the computation. Each daemon will receive the message and induce the process to halt, using a method similar to those listed above. After the distributed computation has halted, another computation may be either started or resumed from a previously-saved checkpoint on the set of now idle nodes. When resuming a computation, the daemon will provide the process being resumed with any changes made in the virtual to network/hardware address mapping as a result of process migration. This information may be provided in the form of, but is not limited to: a flat text file, shared memory locations, or environment variables. After a period of execution this second computation may itself be preempted in the manner described above and replaced with the first computation or some third computation.

In the presence of multiple-queued computations, migrate resumed computations to the subset of nodes that best facilitates minimal idle CPU time while best approximating the resource sharing policy in place. By periodically preempting and/or migrating computations in an ordered manner, a distributed system may concurrently execute any number of distributed computations such that the elapsed time from when a task is submitted to the queue to when it completes is bounded only by the runtime of the computation and the number of tasks in the queue, and will not be affected by the order in which it was queued.

If prioritized resource usage is desired, assign each task a priority value when it is queued. Preempt executing tasks when higher priority tasks are added to the queue. Finally, adjust the period of time in between preemptions such that higher priority tasks are accorded the desired percentage of compute cycles.

Although a specific exemplary method was described in the preemptive scheduling steps presented above, one of skill in the art will recognize that in other embodiments many of the above steps may be re-arranged and/or omitted.

By the foregoing disclosure, an improved system and method is described that may be used for handling of the checkpoint/restart problem in a manner that is non-blocking, that may enable the migration of individual processes, and that may be transparent to the application, any middleware that is in use, and the operating system. Other advantages may include one or more of the following features:

1. A transparent, migration capable method of guaranteeing the global consistency of a communication channel and the processes at either end during a checkpoint.

2. A method for atomically (i.e., storing in a manner that no corruption or change of state can occur) storing the state of a process that reduces the checkpoint of a distributed computation from a global synchronization operation to a per-process localized operation.

3. A transparent and non-blocking method of coordinating the local checkpointing of all the processes taking part in a distributed computation such that the aggregate of the individual checkpoints represents a globally consistent state that can be used to resume the computation at a later point in time.

4. A non-blocking method for storing the checkpoint state that enables an application to continue computation during the process of storing the checkpoint state to non-volatile storage.

The foregoing description of specific embodiments reveals the general nature of the disclosure sufficiently that others can, by applying current knowledge, readily modify and/or adapt it for various applications without departing from the generic concept. For example, although the disclosure was presented above in the context of using a checkpoint library as a user-level library, in certain other embodiments the checkpoint library could be implemented as a kernel module. Therefore, such adaptations and modifications are within the meaning and range of equivalents of the disclosed embodiments. The phraseology or terminology employed herein is for the purpose of description and not of limitation.

The invention claimed is:

1. A node, comprising:
    a memory having a first buffer and a second buffer; and
    a processor configured to access the memory, the processor configured to:
        record a first set of memory locations to the second buffer during a first checkpoint interval;
        swap the second buffer with the first buffer; and
        create a checkpoint from contents of the first set of memory locations, while a second set of memory locations is recorded to the second buffer during a second checkpoint interval, wherein to create the checkpoint, the processor is configured to record the contents of the first set of memory locations to a location other than the first buffer and the second buffer.

2. The node of claim 1 wherein at least one of the first set of memory locations and the second set of memory locations is modified by the processor.

3. The node of claim 1, wherein the processor is configured to store into the second buffer a current commit list of memory locations modified during or after a last checkpoint interval and to store into the first buffer a previous commit list of memory locations modified before the last checkpoint interval.

4. A node, comprising:
a memory having a first buffer and a second buffer; and
a processor configured to access the memory, the processor configured to:
record a first set of memory locations to the second buffer during a first checkpoint interval;
swap the second buffer with the first buffer; and
create a checkpoint from contents of the first set of memory locations, while recording a second set of memory locations to the second buffer during a second checkpoint interval,
wherein the processor is configured to create the checkpoint by storing the contents of the first set of memory locations in a certain order and is configured to store the contents of a memory location from the first set of memory locations earlier than it would otherwise be stored when the processor needs to modify the memory location while the processor is creating the checkpoint.

5. The node of claim 4, wherein the processor is configured to write protect the first set of memory locations before the second set of memory locations is modified.

6. The node of claim 4, wherein the processor is configured to suspend a process between the first checkpoint interval and the second checkpoint interval and to write protect the first set of memory locations while the process is suspended.

7. The node of claim 6, wherein the processor is configured to execute a barrier operation following a completion of the write protect of the first set of memory locations and to end the barrier operation before the process is resumed during the second checkpoint interval.

8. The node of claim 4, wherein the processor is configured to create the checkpoint when the contents of the first set of memory locations are stored and to remove the write protection for a memory location from the first set of memory locations when the processor needs to modify the memory location upon the contents of the memory location being stored.

9. The node of claim 8, wherein the processor is configured to remove a record of the memory location and the write protection for the memory location after the contents of the memory location have been stored.

10. The node of claim 4, wherein the processor is configured to create the checkpoint when the contents of the first set of memory locations are stored to a checkpoint file.

11. The node of claim 4, wherein the processor is configured to remove a record of a memory location from the first set of memory locations after the contents from the memory location is stored in the checkpoint file.

12. The node of claim 4, wherein the processor is configured to create the checkpoint when the contents of the first set of memory locations are stored in non-volatile storage.

13. A node, comprising:
a memory having a first buffer and a second buffer; and
a processor configured to access the memory, the processor configured to:
record a first set of memory locations modified by the processor to the second buffer during a first checkpoint interval;
swap the second buffer with the first buffer;
create a checkpoint from contents of the first set of memory locations, while recording a second set of memory locations modified by the processor to the second buffer during a second checkpoint interval;
store in the memory a copy of each message output from the node during the process until an acknowledgement is received;
output each message copied in the memory that does not receive an acknowledgement;
output an acknowledgement for each message received.

14. A node, comprising:
a memory; and
a processor configured to access the memory, the processor configured to:
record a set of memory locations modified by the processor during a checkpoint interval; and
create a checkpoint from contents of the set of memory locations,
wherein when the processor creates the checkpoint, the processor is configured to store the contents of the set of memory locations in a certain order and to store the contents of a memory location in the set of memory locations out-of-order when the processor needs to modify the memory location while the processor is creating the checkpoint.

15. The node of claim 14, wherein the processor is configured to store the contents of the memory location earlier than it would otherwise be stored when the processor needs to modify the memory location while the processor is creating the checkpoint.

16. A node, comprising:
memory; and
a processor configured to store in the memory an epoch identifier and a copy of each message output from the node until an acknowledgement is received, wherein the epoch identifier and the copy of each message output are used to create a checkpoint;
wherein a failure is determined to occur when the epoch identifier differs from other epoch identifiers on other nodes while processes are operated on the other nodes, and
wherein when a subsequent failure occurs, the processor is further configured to roll the node back to the checkpoint and to output each message copied in the memory that does not receive an acknowledgement after the node is rolled back to the checkpoint.

17. The node of claim 16, wherein the processor is further configured to perform at least one of: receive messages, to output an acknowledgement for each message received, to recognize and discard duplicate messages received by the node, and for each duplicate message, to output an acknowledgement.

18. The node of claim 16, wherein the processor is configured to perform at least one of:
create the checkpoint from contents of a set of memory locations;
store the contents of the set of memory locations in a certain order; and store the contents of a memory location in the set of memory locations out-of-order when the processor needs to modify the memory location while the processor creates the checkpoint.

19. The node of claim 16, wherein the processor is configured to store the contents of the memory location earlier that it would otherwise be stored when the processor needs to modify the memory location while the processor creates the checkpoint.

20. A node, comprising:
   a processor configured to:
      output an acknowledgement for each message received;
      maintain an epoch identifier;
      create a checkpoint; and
      change the epoch identifier upon the checkpoint being completed;
   wherein a failure is determined to occur when the epoch identifier differs from other epoch identifiers on other nodes, and
   wherein if a subsequent failure occurs, the processor is further configured to:
      roll the node back to the checkpoint; and
      discard duplicate messages received by the node after the node is rolled back to the checkpoint.

* * * * *